United States Patent
Handzel et al.

(10) Patent No.: US 10,121,577 B2
(45) Date of Patent: Nov. 6, 2018

(54) INTEGRAL INDUCTOR ARRANGEMENT

(71) Applicant: SMA Solar Technology AG, Niestetal (DE)

(72) Inventors: Milosz Handzel, Cracow (PL); Stefan Domagala, Rzaska (PL); Marek Rylko, Bielsko-Biala (PL); Mariusz Walczak, Cracow (PL); Mariusz Gwadera, Cracow (PL); Artur Dziekan, Cracow (PL)

(73) Assignee: SMA Solar Technology AG, Niestetal (DE)

( * ) Notice: Subject to any disclaimer, the term of this patent is extended or adjusted under 35 U.S.C. 154(b) by 21 days.

(21) Appl. No.: 15/608,143

(22) Filed: May 30, 2017

(65) Prior Publication Data

US 2017/0263360 A1    Sep. 14, 2017

Related U.S. Application Data

(63) Continuation of application No. 14/542,845, filed on Nov. 17, 2014, now abandoned, which is a
(Continued)

(30) Foreign Application Priority Data

May 18, 2012    (PL) .......................................... 399233

(51) Int. Cl.
*H01F 27/24* (2006.01)
*H01F 3/14* (2006.01)
(Continued)

(52) U.S. Cl.
CPC ............. *H01F 3/14* (2013.01); *H01F 27/263* (2013.01); *H01F 27/28* (2013.01); *H01F 27/303* (2013.01); *H01F 27/325* (2013.01); *H02M 1/126* (2013.01)

(58) Field of Classification Search
CPC .................................................. H01F 27/303
See application file for complete search history.

(56) References Cited

U.S. PATENT DOCUMENTS 2,760,145 A * 8/1956 Dunn .................... H01F 38/085
                                                       219/130.31
3,622,928 A * 11/1971 Lee ......................... H01F 29/10
                                                         336/134
(Continued)

FOREIGN PATENT DOCUMENTS

CN         201167285 Y    12/2008
DE       102008046576 A1    3/2010
(Continued)

OTHER PUBLICATIONS

International Search Report dated Jan. 31, 2013 for international application No. PCT/EP2013/060767.
(Continued)

*Primary Examiner* — Ronald Hinson
(74) *Attorney, Agent, or Firm* — Eschweiler & Potashnik, LLC

(57) ABSTRACT

The disclosure relates to an integral inductor arrangement with at least three magnetic loops arranged side by side to each other in a row and at least one winding associated with each of the magnetic loops. The magnetic loops are formed by individual core elements, each of which being part of one of the magnetic loops, and shared core elements, each of which being part of two adjacent of the magnetic loops. The shared core elements are separated from the individual core elements by magnetic gaps and each of the at least one winding is arranged around one of the individual core elements. The disclosure further relates to a use of such integral inductor arrangement within a 3-phase AC-filter for a power inverter for feeding electrical power into a power grid.

19 Claims, 3 Drawing Sheets

Related U.S. Application Data continuation of application No. PCT/EP2012/060767, filed on Jun. 6, 2012.

(51) Int. Cl.
*H02M 1/12* (2006.01)
*H01F 27/26* (2006.01)
*H01F 27/30* (2006.01)
*H01F 27/28* (2006.01)
*H01F 27/32* (2006.01)

(56) References Cited

U.S. PATENT DOCUMENTS

| | | | | |
|---|---|---|---|---|
| 4,283,842 | A * | 8/1981 | DeLaurentis | H01F 27/245 29/606 |
| 6,668,444 | B2 | 12/2003 | Ngo et al. | |
| 6,801,421 | B1 * | 10/2004 | Sasse | H01F 29/146 174/102 SC |
| 7,154,366 | B2 * | 12/2006 | Hsueh | H01F 5/02 336/198 |
| 7,830,235 | B2 | 11/2010 | Raiser et al. | |
| 8,284,008 | B2 * | 10/2012 | Koh | H01F 3/14 336/178 |
| 8,866,580 | B2 | 10/2014 | Hasegawa et al. | |
| 2004/0085174 | A1 * | 5/2004 | Decristofaro | H01F 3/14 336/178 |
| 2005/0258926 | A1 | 11/2005 | Weger | |
| 2007/0241854 | A1 | 10/2007 | Nord | |
| 2008/0055034 | A1 * | 3/2008 | Tsunemi | H01F 3/10 336/83 |
| 2010/0060397 | A1 | 3/2010 | Raiser et al. | |
| 2010/0060404 | A1 | 3/2010 | Raiser et al. | |
| 2010/0271164 | A1 | 10/2010 | Kitajima et al. | |

FOREIGN PATENT DOCUMENTS

| | | |
|---|---|---|
| EP | 2068430 A2 | 6/2009 |
| JP | S63178311 A | 7/1988 |
| JP | H1041164 A | 2/1998 |
| JP | H11144971 A | 5/1999 |
| JP | H11204355 A | 7/1999 |
| JP | 2001230134 A | 8/2001 |
| JP | 2005080442 A | 3/2005 |
| JP | 2006245050 A | 9/2006 |
| JP | 2011159851 A | 8/2011 |
| PL | 317471 A1 | 6/1998 |

OTHER PUBLICATIONS

Non-Final Office Action dated Feb. 10, 2015 in connection with U.S. Appl. No. 14/542,845.
Final Office Action dated Sep. 15, 2015 in connection with U.S. Appl. No. 14/542,845.
Non-Final Office Action dated Mar. 14, 2016 in connection with U.S. Appl. No. 14/542,845.
Final Office Action dated Nov. 29, 2016 in connection with U.S. Appl. No. 14/542,845.

* cited by examiner

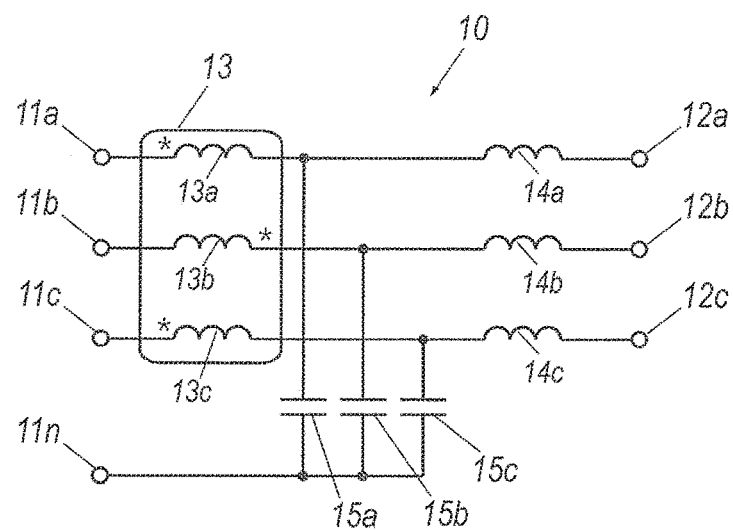
Fig. 2
Fig. 1c

INTEGRAL INDUCTOR ARRANGEMENT

REFERENCE TO RELATED APPLICATIONS

This application is a continuation of U.S. patent application Ser. No. 14/542,845 filed Nov. 17, 2014 in the name of Milosz Handzel, et al. entitled "Integral Inductor Arrangement", which is a continuation of international application number PCT/EP2012/060767 filed on Jun. 6, 2012, which claims priority to Polish application number P.399233 filed on May 18, 2012.

FIELD

The disclosure relates to an integral inductor arrangement, and in particular for the use of such an arrangement within a 3-phase alternating current (AC)-filter for a power inverter for feeding electrical power into a power grid.

BACKGROUND

Increasing energy costs from fossil fuels stimulates renewable energy acquisitions. Furthermore, in many countries legal requirements exist to reduce the production of greenhouse emissions, e.g. in the European Union. Since renewable energy is often generated in the form of electric current which could use the existing energy transmission infrastructure, it is necessary for renewable energy converters to match the transmission system parameters. It is, for example, required that electrical energy fed in a power grid matches parameters such as: voltage, frequency and phase angle. Usually, this is achieved by using power inverters that, by means of power electronic commutation circuits, form appropriately shaped one to three-phase currents. The electric current provided by the inverter often contains undesired high frequency components, besides the fundamental 50 Hertz (Hz) or 60 Hz grid frequency. Partial elimination of the high frequency current components is achieved by using filtering circuits, sometimes also referred to as sine-filters. Such filters usually contain inductors in combination with capacitors.

The profitability of renewable energy is determined by the cost of the generation system that includes, among other components, an energy source, e.g. a photovoltaic generator, as well as the inverter, but also by the efficiency of the system. Therefore, any improvements that allow for a reduction of the size and/or the weight of inductive components are within the scope of interest. A reduction in size and/or weight does not only lead to specific material savings, but also to a reduction of power losses.

The document U.S. Pat. No. 7,830,235 describes an integrated inductor arrangement used in a direct-current (DC) input stage for an inverter coupled to a fuel cell. The inductor arrangement contains inductive elements associated with magnetic loops, where adjoining magnetic loops share common core pieces. Thanks to this, the total weight of the integrated inductor arrangement is reduced compared to separated inductors. The solution according to the document U.S. Pat. No. 7,830,235 is intended for a DC/DC-converter. The energy from the DC-source is boosted by transmitting it to the one of the inductive elements and then, after opening the switching elements in the DC-input stage, transferred to a higher voltage. Since the time required for energizing the inductor is longer than the time needed to transfer the energy to the load, the inductor was tripled in order to reduce time without constraining the energy transfer to the load. According to document U.S. Pat. No. 7,830,235, windings are arranged around magnetic gaps, e.g. air gaps, that separate different core elements, which results in additional power losses due to fringing flux around the air gap. Furthermore, core elements with an elaborate shape are used, which will increase manufacturing costs.

SUMMARY

It is desired to provide an integral inductor arrangement that is free of disadvantages discussed above.

An integral inductor arrangement according to the disclosure has at least three magnetic loops arranged side by side to each other in a row and at least one winding associated with each of the magnetic loops. The magnetic loops are formed by individual core elements, each of which is part of one of the magnetic loops, and shared core elements, each of which is part of two adjacent of the magnetic loops. The shared core elements are separated from the individual core elements by magnetic gaps and each of the at least one winding is arranged around one of the individual core elements.

Since the windings are positioned on the individual core elements, the windings are accordingly not wound around the magnetic gaps. As a result, a fringing flux due to the magnetic gap does not influence the windings, thereby reducing magnetic losses and enhancing the efficiency of the inductor arrangement. Still, a reduction of weight is given due to the shared core elements that are part of two adjacent magnetic loops.

In an advantageous embodiment of the integral inductor arrangement, the shared core elements are arranged perpendicular to the individual core elements. This allows for an easy assembly of the arrangement.

In a further advantageous embodiment of the integral inductor arrangement, the individual core elements and the shared core elements have the same cross-sectional area. This leads to maximum material savings.

In a further advantageous embodiment of the integral inductor arrangement, the windings associated with two adjacent magnetic loops have a different sense of winding. This way, the maximum magnetic flux in the shared core elements does not exceed the maximum magnetic flux in the individual core elements when the integral inductor arrangement is used as a three-phase AC-filter.

In a further advantageous embodiment of the integral inductor arrangement, the shared core elements and/or the individual core elements are cuboidal blocks. In one embodiment, all core elements are cuboidal blocks or are combinations of two or more cuboidal blocks, and in one embodiment all of the same size and/or material. That way, costs for production and storage can be reduced.

In further advantageous embodiments of the integral inductor arrangement, the individual and/or shared core elements are made of stamped silicon steel sheets stacked to form a laminated structure, or are made of ferrite or of laminated magnetic amorphous metal or of sintered powder of magnetic material. In one embodiment individual core elements that carry a winding are made of sintered powder of magnetic material and all other individual core elements and the shared core elements are made of high magnetic permeability material.

In a further advantageous embodiment of the integral inductor arrangement, the magnetic gaps are filled with dielectric distance pieces. In yet a further advantageous embodiment the windings are wound on bobbins. In one embodiment the bobbins have means for fixing the shared core elements. These features allow for an easy mounting of the arrangement.

In a further advantageous embodiment of the integral inductor arrangement, the arrangement of core elements is secured by a compressing force. Further, in one embodiment the compressing force originates from bolts acting on two clamps which are positioned on each head end of the arrangement. That way, a very cost-effective and material saving assembly of the arrangement is provided.

According to another aspect of the disclosure, such an integral inductor arrangement is used within a 3-phase AC-filter for a power inverter for feeding electrical power into a power grid. The phase shifts in 3-phase AC-filter are such that the shared core elements can advantageously have the same cross-section as the individual core elements, thus leading to a maximum material saving of core material.

BRIEF DESCRIPTION OF THE DRAWINGS

The disclosure will be explained in more detail in the following text using exemplary embodiments and with the aid of three figures, in which:

FIG. 2 shows an example setup of an AC-filter for which the integral inductor arrangement according to the present disclosure can be used.

DETAILED DESCRIPTION

Figure 1:
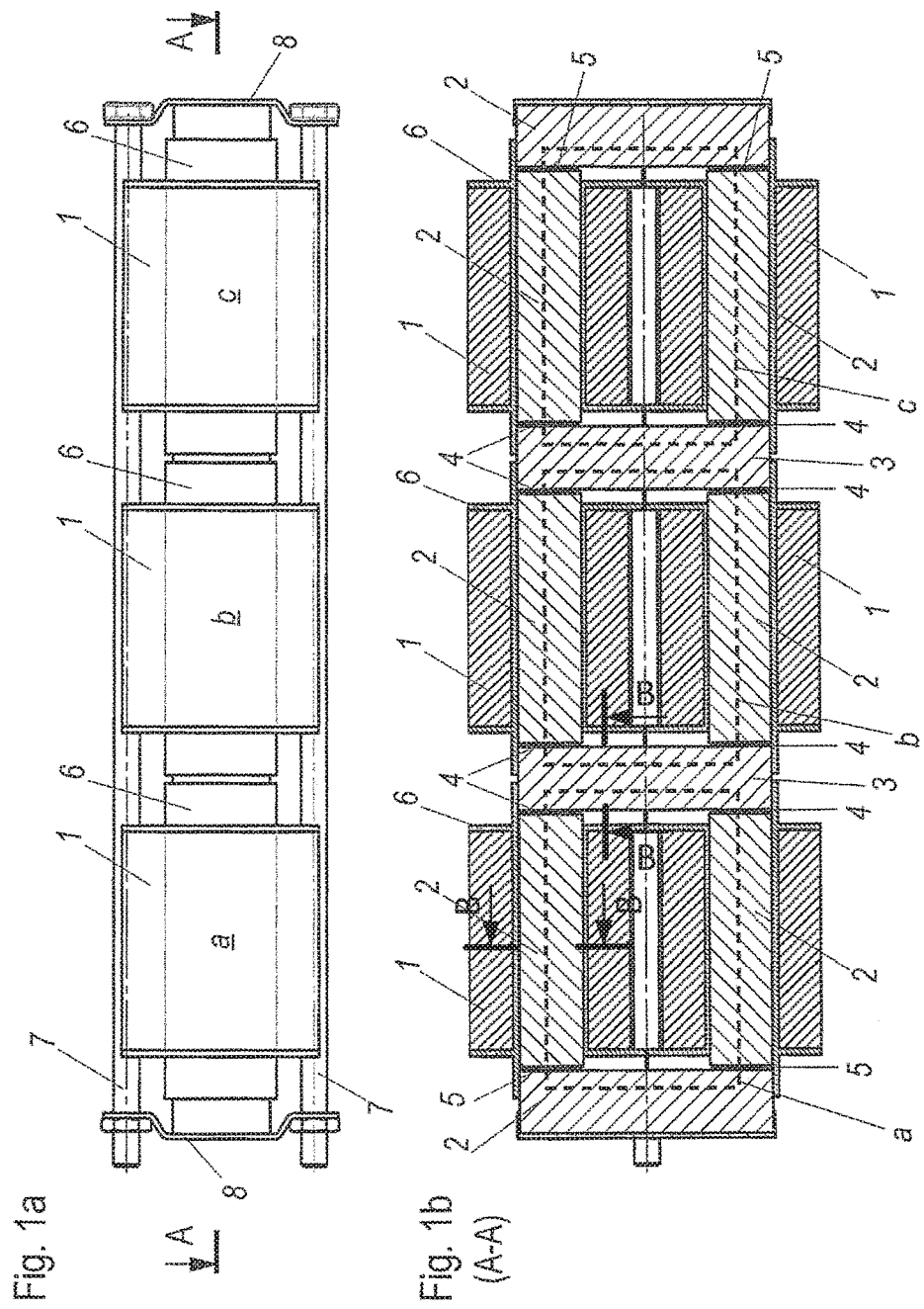
FIGS. 1A-1C show an example embodiment of an integral inductor arrangement.

FIG. 1a shows a top view of an integral inductor arrangement according to the application. FIG. 1b depicts a sectional view of the integral inductor arrangement along the line A-A indicated in FIG. 1a.

In the given example, the integral inductor arrangement comprises six windings 1 forming three pairs, where each pair is associated with one of three magnetic loops a, b, c. The loops are defined by core elements 2, 3 that show a high magnetic permeability. The core elements 2, 3 are, for example, made of stamped silicon steel sheets stacked to form a laminated structure, of ferrite, of laminated magnetic amorphous metal, or of sintered magnetic powder.

The magnetic loops a, b, c are arranged along a line, side by side to each other. Thus, one inner magnetic loop b is flanked by two outer magnetic loops a, c, one on each side of the inner magnetic loop b.

The core elements 2, 3 that form and define the magnetic loops a, b, c can be distinguished into individual core elements 2 which belong to one magnetic loop a, b, c only and shared core elements 3 which are shared by two adjacent magnetic loops a, b or b, c, respectively. The windings 1 are positioned on individual core elements 2 only and not on the shared core elements 3. The shared core elements 3 are separated from the individual core elements 2 by magnetic gaps 4, which are e.g. formed by a dielectric plate. The magnetic gaps 4 are small sections of a low magnetic permeability. They decouple the magnetic loops a, b, c from each other.

Since the windings 1 are positioned on the individual core elements 2, the windings 1 are accordingly not wound around the magnetic gaps 4. As a result, a fringing flux due to the magnetic windings 1 does not influence the windings 1, thereby reducing magnetic losses and enhancing the efficiency of the inductor arrangement. Advantageously, the windings 1 associated with two adjacent magnetic loops a, b and b, c have different senses of winding, as also indicated by the stars in FIG. 2 and described below in connection with FIG. 2.

In one embodiment the two shared core elements 3 are cuboidal shape. The individual core elements 2 of the outer magnetic loops a, c are c-shaped. Each could be formed by a single c-shaped piece. However, as shown in the example, each may also be formed by three cuboidal blocks, arranged in c-shape. The three blocks may be optionally separated from each other by further magnetic gaps 5. The individual core elements 2 of the inner magnetic loop b may comprise or consist of two cuboidal blocks. Thus, in the advantageous embodiment shown in FIG. 1b, the core of the integral inductor arrangement is composed of ten cuboidal blocks of which two blocks (shared core elements 3) and the blocks on each side are orthogonally placed to the remaining six blocks that are organized in two parallel lines by three blocks each. The ten cuboidal blocks may be of equal size and material, thereby decreasing costs for production and storage. As shown in FIG. 1c, the shared core elements are cuboidal blocks, or the individual core elements that carry a winding have an elliptical cross section.

In one embodiment the windings 1 are arranged on bobbins 6 that are equipped with appropriate fixing means, e.g. a skirting, which provide support for the shared core elements 3 when the bobbins 6 are positioned on the individual core elements 2. The whole arrangement of the core elements 2, 3 may be fixed by compressing the arrangement along its longitudinal axis using two long screws 7 or bolts and profiled clamps 8, for example, made from metal.

Figure 3:
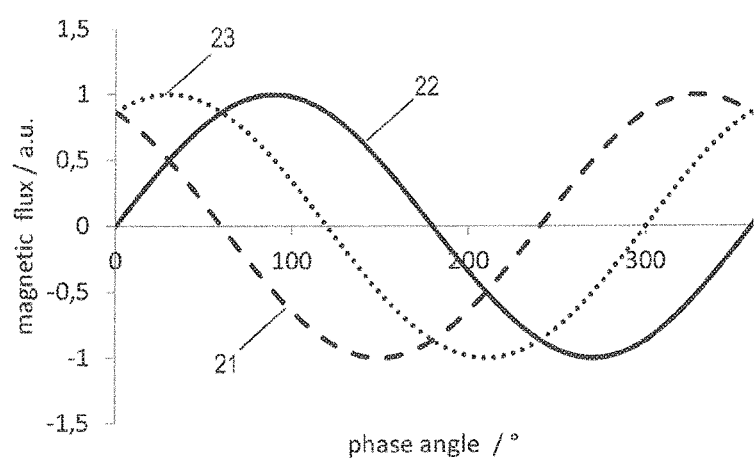
FIG. 3 shows a diagram of the time-dependence of the magnetic flux in a shared core element of an integral inductor arrangement.

The advantageous circumstances for using the integral inductor arrangement according to the application in a three-phase AC-filter 10 as shown in FIG. 2 are explained in connection with FIG. 3. FIG. 3 shows the time dependence of a first magnetic flux 21 that exists in one of the outer magnetic loops a,c of the arrangement shown in FIG. 1 and a second magnetic flux 22 that exists in the inner magnetic loop b. Both magnetic fluxes 21, 22 are shown in arbitrary units, scaled to an amplitude of one. The time dependence is shown as a phase angle in degrees, i.e. the diagram shows one period of the grid frequency. The magnetic fluxes 21, 22 are proportional to the currents in the respective windings. Due to the nature of the three-phase current, the magnetic fluxes 21, 22 are shifted by 120° with respect to each other.

FIG. 2 shows a three-phase AC-filter 10 that is arranged, for example, between a power inverter and a power grid in a schematic wiring diagram. The AC-filter 10 has three inputs 11a, 11b, 11c that are connected to the three output-lines of the inverter and a further input 11n connected to a neutral line. Three outputs 12a, 12b, 12c then lead to the respective lines of a power grid. The AC-filter 10 comprises three first inductors 13a, 13b, 13c, three second inductors 14a, 14b, 14c and three capacitors 15a, 15b, 15c. According to the disclosure, the first inductors 13a, 13b, 13c and/or the three second inductors 14a, 14b, 14c may be provided by an integral inductor arrangement, e.g. the one shown in FIG. 1. By way of example, the box 13 in FIG. 2 indicated that the three first inductors 13a, 13b, 13c are integral in this case. A different sense of winding of adjacent magnetic loops a, b, c of the integral inductor arrangement is indicated by the stars next to the winding-symbol in the figure.

A third magnetic flux 23 which is the sum of the two magnetic fluxes 21 and 22 is shown in FIG. 3. This third magnetic flux 23 represents the time dependence of the flux in one of the shared core elements 3. It is apparent that this flux never exceeds the maximum value of the flux density of any of the single components, i.e. the magnetic fluxes 21, 22. Due to this fact it is possible to reduce the cross-sectional area of the shared core elements 3 to the cross-sectional area of the individual core elements and thus to a value smaller than that of two blocks as in a simple combination of discrete setups, without the risk to exceeding the maximum flux density for the magnetic material used.

The invention claimed is:

1. An integral inductor arrangement with at least three magnetic loops arranged side by side to each other in a row and at least one winding associated with each of the magnetic loops, the magnetic loops being formed by individual core elements, each of which being part of one of the magnetic loops, and shared core elements, each of which being part of two adjacent of the magnetic loops, wherein the shared core elements are separated from the individual core elements by magnetic gaps which are arranged each between a respective end surface of an individual core element and a respective side surface of an end section of a shared core element, and each of the at least one winding is arranged around one of the individual core elements and not arranged around the magnetic gaps, wherein each of the at least one winding defines a respective one of the magnetic loops, and further wherein the magnetic gaps comprise dielectrics, air gaps or magnetic materials having a lower permeability than the individual or shared core elements.

2. The integral inductor arrangement according to claim 1, wherein the shared core elements are arranged perpendicular to the individual core elements of at least one inner magnetic loop of the at least three magnetic loops arranged side by side to each other in a row.

3. The integral inductor arrangement according to claim 1, wherein the individual core elements and the shared core elements have the same cross-sectional area.

4. The integral inductor arrangement according to claim 1, wherein the windings associated with two adjacent of the magnetic loops have a different sense of winding.

5. The integral inductor arrangement according to claim 1, wherein individual core elements that carry a winding have an elliptical cross section.

6. The integral inductor arrangement according to claim 1, wherein the individual and/or shared core elements are made of stamped silicon steel sheets stacked to form a laminated structure.

7. The integral inductor arrangement according to claim 1, wherein the individual and/or shared core elements are made of ferrite.

8. The integral inductor arrangement according to claim 1, wherein the individual and/or shared core elements are made of laminated magnetic amorphous metal.

9. The integral inductor arrangement according to claim 1, wherein the individual and/or shared core elements are made of sintered powder of magnetic material.

10. The integral inductor arrangement according to claim 1, wherein individual core elements that carry a winding are made of sintered powder of magnetic material and all other individual core elements and the shared core elements are made of high magnetic permeability material.

11. The integral inductor arrangement according to claim 1, wherein the shared core elements are cuboidal blocks.

12. The integral inductor arrangement according to claim 11, wherein all cuboidal blocks are of equal size.

13. The integral inductor arrangement according to claim 1, wherein two of the magnetic loops are outer magnetic loops that are positioned around an inner magnetic loop, wherein the individual core elements of the outer magnetic loops are c-shaped.

14. The integral inductor arrangement according to claim 13, wherein the individual core element of each of the outer magnetic loops comprises three cuboidal blocks.

15. The integral inductor arrangement according to claim 13, wherein the individual core element of the inner magnetic loop comprises two cuboidal blocks.

16. The integral inductor arrangement according to claim 1, wherein the windings are wound on bobbins.

17. The integral inductor arrangement according to claim 16, wherein the bobbins have means for fixing the shared core elements.

18. The integral inductor arrangement according to claim 1, wherein the arrangement of core elements is secured by a compressing force.

19. The integral inductor arrangement according to claim 18, wherein the compressing force originates from bolts acting on two clamps, positioned on each head end of the arrangement.

* * * * *